US006469888B1

(12) United States Patent
Otsuki et al.

(10) Patent No.: US 6,469,888 B1
(45) Date of Patent: Oct. 22, 2002

(54) NON-AQUEOUS ELECTROLYTE ELECTRIC DOUBLE-LAYER CAPACITOR

(75) Inventors: Masashi Otsuki, Musashimurayama (JP); Shigeki Endo, Tokorozawa (JP); Takao Ogino, Tokorozawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/708,537

(22) Filed: Nov. 9, 2000

(30) Foreign Application Priority Data

| Nov. 25, 1999 | (JP) | 11-334962 |
| Nov. 25, 1999 | (JP) | 11-334963 |
| Nov. 25, 1999 | (JP) | 11-334964 |
| Apr. 26, 2000 | (JP) | 2000-126567 |
| Apr. 27, 2000 | (JP) | 2000-128243 |
| Apr. 27, 2000 | (JP) | 2000-128244 |
| Apr. 27, 2000 | (JP) | 2000-128245 |
| Nov. 25, 2000 | (JP) | 11-334952 |

(51) Int. Cl.[7] .................................................. H01G 9/00
(52) U.S. Cl. ..................... 361/502; 361/503; 361/504; 361/508; 361/512; 29/25.03
(58) Field of Search ................................. 361/502, 508, 361/509, 512, 516, 528, 532, 433, 503, 504; 29/25.03

(56) References Cited

FOREIGN PATENT DOCUMENTS

| JP | A-06-013108 | | 1/1994 |
| JP | 406013108 A | * | 1/1994 |
| JP | A-11-144757 | | 5/1999 |
| JP | A-11-191431 | | 7/1999 |
| JP | A-2000-021442 | | 1/2000 |
| JP | A-2000-030740 | | 1/2000 |
| JP | 2001217154 | * | 8/2001 |

* cited by examiner

Primary Examiner—Dean A. Reichard
Assistant Examiner—Nguyen Ha
(74) Attorney, Agent, or Firm—Oliff & Berridge, PLC

(57) ABSTRACT

A non-aqueous electrolyte electric double-layer capacitor in which there is no danger of being ignited, bursting or catching flame at the time of a short-circuit, has low internal resistance, superior properties at low temperatures, and is self-extinguishable or incombustible. In a first aspect, a non-aqueous electrolyte includes a non-aqueous electrolyte having a phosphazene derivative. In a second aspect, a potential window of the phosphazene derivative is a range having a lower limit of +0.5 or lower and an upper limit of +4.5 or higher, and a potential window of the organic solvent has a wider range than the potential window of the phosphazene derivative. In a third aspect, a conductivity of a quaternary ammonium salt solution (0.5 mol/l) is 2.0 mS/cm. In a fourth aspect, a permittivity thereof at a temperature of 25° C. is 15 or higher and a viscosity thereof is 20 mPa·s (20 cP) or lower.

19 Claims, No Drawings

NON-AQUEOUS ELECTROLYTE ELECTRIC DOUBLE-LAYER CAPACITOR

BACKGROUND OF THE INVENTION

1. Field of the Invention

The present invention relates to a non-aqueous electrolyte electric double-layer capacitor appropriately used in back-up power supplies, auxiliary power supplies and the like, and various types of energy reserves.

2. Description of the Related Art

Non-aqueous electrolyte electric double-layer capacitors are capacitors that use an electric double-layer formed between a polarizable electrode and an electrolyte. These capacitors were first developed and produced in the 1970s, underwent a period akin to early infancy in the 1980s, and experienced a period of growth and development beginning in the 1990s.

Non-aqueous electrolyte electric double-layer capacitors differ from batteries in that the charge/discharge cycle of a non-aqueous electrolyte electric double-layer capacitor is a cycle in which ions are electrically adsorbed from an electrolyte on an electrode surface, while the charge/discharge cycle of a battery is an oxidation-reduction reaction cycle accompanied by a mass transfer. In comparison with batteries, non-aqueous electrolyte electric double-layer capacitors have the following advantages: the capacitors have excellent instantaneous charge/discharge properties which show virtually no deterioration even when charge/discharge is repeated; because there is no charge/discharge overvoltage at the time of charge/discharge, the capacitors suffice as simple and inexpensive electrical circuits; the remaining capacity can be easily understood; the capacitors have durable temperature properties in temperature conditions within a range of $-30°$ C. to $90°$ C.; and the capacitors are non-polluting. For these reasons, non-aqueous electrolyte electric double-layer capacitors have been spotlighted in recent years as an environmentally sound, new energy reserve product.

A non-aqueous electrolyte electric double-layer capacitor is an energy reserve device having a positive and negative polarizable electrode and an electrolyte. In a contact surface between the polarizable electrode and the electrolyte, positive and electric charges oppose one another in an array with an extremely short distance separating the charges to form an electric double-layer. Because the electrolyte serves as an ion source for the purpose of forming the electric double-layer, similar to the polarizable electrode, the electrolyte is an important substance that controls the basic properties of the energy reserve device.

Conventionally, aqueous electrolytes, non-aqueous electrolytes, solid electrolytes and the like have been known as the aforementioned electrolyte. However, from the standpoint of improving the energy density of a non-aqueous electrolyte electric double-layer capacitor, non-aqueous electrolytes in particular have garnered attention among these electrolytes because a high operational voltage can be set. Application of non-aqueous electrolytes has therefore progressed.

At present, non-aqueous electrolytes in which a solute (supporting electrolyte) such as $(C_2H_5)_4P \cdot BF_4$ or $(C_2H_5)_4N \cdot BF_4$ or the like has been dissolved in an organic solvent having a high permittivity such as a carbonate (e.g., ethyl carbonate, propylene carbonate and the like), gamma butyrolactone or the like are being applied.

However, because the flash point of the solvent included in these non-aqueous electrolytes is low, there has been the problem that when the non-aqueous electrolyte electric double-layer capacitor is ignited by heat or the like, the non-aqueous electrolyte catches fire, flames spread over the surface of the non-aqueous electrolyte, and the risk of danger is therefore high. There has also been the problem that vaporization and decomposition of the non-aqueous electrolyte due; to heat or the like can generate gas which causes the non-aqueous electrolyte electric double-layer capacitor to burst or ignite, whereby the non-aqueous electrolyte catches fire, flames spread over the surface of the non-aqueous electrolyte, and the risk of danger is therefore high.

Attendant to the application of non-aqueous electrolyte electric double-layer capacitors in recent years, expectations have come to be placed on the development of electric automobiles, hybrid cars and the like, and the demand for the safety of non-aqueous electrolyte electric double-layer capacitors continues to escalate each day.

In the midst of such circumstances, development has been anticipated of non-aqueous electrolyte electric double-layer capacitors whose safety is fundamentally high regardless of safety measures such as providing auxiliary parts like safety valves, which have respective properties such as safety, charge/discharge amount and low internal resistance which are equally as superior as those of conventional non-aqueous electrolyte electric double-layer capacitors, which have excellent resistance to flammability, excellent self-extinguishability or incombustibility, excellent resistance to deterioration, excellent long-term stability, are electrochemically safe and easy to manufacture.

SUMMARY OF THE INVENTION

In response to such demands, the present invention was devised in order to solve the various problems occurring in the conventional art and achieve the following objects.

A first object of the present invention is to provide a non-aqueous electrolyte electric double-layer capacitor in which there is no danger of being ignited, which exhibits excellent safety as a result of there being no danger of bursting or catching flame in the event of a short-circuit, which maintains sufficient electrical conductivity, in which the surface resistance of the non-aqueous electrolyte is low, and which has excellent properties at low temperatures.

A second object of the present invention is to provide a non-aqueous electrolyte electric double-layer capacitor able to maintain safety and long-term stability required as a capacitor, which has excellent self-extinguishability or incombustibility, is electrochemically safe and resistant to deterioration, in which the surface resistance of the non-aqueous electrolyte is low, and which has excellent properties at low temperatures.

A third object of the present invention is to provide a non-aqueous electrolyte electric double-layer capacitor which maintains respective properties required as a non-aqueous electrolyte electric double-layer capacitor such as low internal resistance, has excellent self-extinguishability or incombustibility and is resistant to deterioration, in which the surface resistance of the non-aqueous electrolyte is low, and which has excellent properties at low temperatures.

A fourth object of the present invention is to provide a non-aqueous electrolyte electric double-layer capacitor which maintains respective properties required as a non-aqueous electrolyte electric double-layer capacitor such as low internal resistance, has excellent self-extinguishability or incombustibility and is resistant to deterioration, in which the surface resistance of the non-aqueous electrolyte is low, and which by using only a phosphazene derivative as a solvent exhibits excellent long-term stability, can be easily manufactured and has excellent properties at low temperatures.

A first aspect of the non-aqueous electrolyte electric double-layer capacitor of the present invention for the purpose of achieving the first object is a non-aqueous electrolyte electric double-layer capacitor comprising a non-aqueous electrolyte having a supporting electrolyte and a phosphazene derivative, and a positive electrode and a negative electrode.

A second aspect of the non-aqueous electrolyte electric double-layer capacitor of the present invention for the purpose of achieving the second object is a non-aqueous electrolyte electric double-layer capacitor, further comprising an organic solvent, wherein a potential window of the phosphazene derivative is within a range having a lower limit of +0.5V or lower and an upper limit of +4.5V or higher, and a potential window of the organic solvent is within a wider range than the potential window of the phosphazene derivative.

A third aspect of the non-aqueous electrolyte electric double-layer capacitor of the present invention for the purpose of achieving the third object is a non-aqueous electrolyte electric double-layer capacitor, wherein the phosphazene derivative includes a quaternary ammonium salt solution (0.5 mol/l)) having a conductivity of 2.0 mS/cm or higher.

A fourth aspect of the non-aqueous electrolyte electric double-layer capacitor of the present invention for the purpose of achieving the fourth object is a non-aqueous electrolyte electric double-layer capacitor, wherein the phosphazene derivative has a relative permittivity of 15 or higher at a temperature of 25° C. and a viscosity of 20 mPa·s (20 cP).

DESCRIPTION OF THE PREFERRED EMBODIMENTS

A non-aqueous electrolyte electric double-layer capacitor of the present invention has a positive electrode, a negative electrode and a non-aqueous electrolyte, and additional components as needed.

Positive Electrode

There are no particular limitations on the positive electrode, which can be appropriately selected as long as it meets the objects of the present invention. Generally, however, a carbon polarizable electrode is preferred.

There are no particular limitations on the polarizable electrode, which can be appropriately selected as long as it meets the objects of the present invention. Examples include positive electrodes ordinarily having active carbon, and other components such as a conductive agent, a binder and the like as needed. Preferable among these are electrodes having a large specific surface area and bulk specific gravity, are electrochemically inactive, and have properties such as low resistance and the like.

There are no particular limitations on the material for the active carbon. Suitable examples thereof include phenol resins, various types of heat-resistant resins, pitch and the like.

Suitable examples of heat-resistant resins include polyimides, polyamide imides, polyether imides, polyether sulphones, polyether ketones, bismaleinimide triazines, aramides (aromatic polyamides), fluororesins, polyphenylenes, polyphenylene sulfides and the like. These may be used singly or two or more may be used in combination.

The active carbon used in the positive electrode is preferably in the form of a powder or fiber cloth from the standpoint of raising the specific surface area and increasing the charge amount of the non-aqueous electrolyte electric double-layer capacitor.

The active carbon may be subjected to treatments such as a heat treatment, a drawing treatment, a high-temperature vacuum treatment, a rolling treatment or the like for the purpose of further raising the charge amount of the non-aqueous electrolyte electric double-layer capacitor.

There are no particular limitations on the conductive agent. Examples include graphite, acetylene black and the like.

There are no particular limitations on the materials for the binder. Examples include resins such as polyvinylidene fluoride, tetrafluoroethylene and the like.

Negative Electrode

Suitable examples of the negative electrode include polarizable electrodes similar to the positive electrode.

Non-Aqueous Electrolyte

In the first, third and fourth aspects, the non-aqueous electrolyte includes a supporting electrolyte and a phosphazene derivative, and may include other components as needed.

In the second aspect, the non-aqueous electrolyte includes a supporting electrolyte, a phosphazene derivative and an organic solvent, and may include other components as needed.

Supporting Electrolyte

The supporting electrolyte may be selected from conventionally known supporting electrolytes, but quaternary ammonium salts are preferable in that they exhibit good electrical characteristics such as electric conductivity in non-aqueous electrolytes.

The quaternary ammonium salt is a solute which serves as an ion source for the purpose of forming the electric double-layer in a non-aqueous solution. It is important that the quaternary ammonium salt is one from which multivalent ions can be obtained in terms of the ability to effectively improve the electric conductivity of the non-aqueous electrolyte.

Suitable examples of the quaternary ammonium salt include $(CH_3)_4N.BF_4$, $(CH_3)_3C_2H_5N.BF_4$, $(CH_3)_2(C_2H_5)_2N.BF_4$, $CH_3(C_2H_5)_3N.BF_4$, $(C_2H_5)_4N.BF_4$, $(C_3H_7)_4N.BF_4$, $CH_3(C_4H_9)_3N.BF_4$, $(C_4H_9)_4N.BF_4$, $(C_6H_{13})_4H.BF_4$, $(C_2H_5)_4N.ClO_4$, $(C_2H_5)_4N.BF_4$, $(C_2H_5)_4N.PF_6$, $(C_2H_5)_4N.AsF_6$, $(C_2H_5)_4N.SbF_6$, $(C_2H_5)_4N.CF_3SO_3$, $(C_2H_5)4N.C_4F_9SO_3$, $(C_2H_5)_4N.(CF_3S_2)_2N$, $(C_2H_5)_4N.BCH_3(C_2H_5)_3$, $(C_2H_5)_4N.B(C_2H_5)_4$, $(C_2H_5)_4N.B(C_4H_9)_4$, $(C_2H_{\%})_4N.B(C_6H_5)_4$ and the like, and hexafluorophosphates of these quaternary ammonium salts. Further, in the present invention, quaternary ammonium salts having a high polarizability in which a different alkyl group is bonded to an N atom may also be suitably used for the purpose of improving the solubility of the quaternary ammonium salt.

In the present invention, the compounds indicated by the following structural formulae (1) to (10) may be suitably used as the quaternary ammonium salt.

Structural Formula (1)

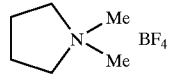

-continued

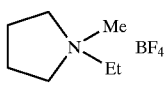

Structural Formula (2)

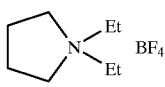

Structural Formula (3)

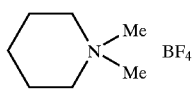

Structural Formula (4)

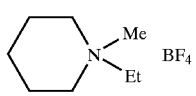

Structural Formula (5)

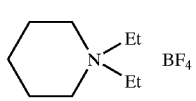

Structural Formula (6)

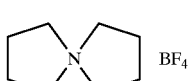

Structural Formula (7)

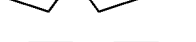

Structural Formula (8)

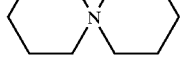

Structural Formula (9)

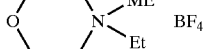

Structural Formula (10)

In the structural formulae above, Me indicates a methyl group and Et indicates an ethyl group.

Among these quaternary ammonium salts, a salt which releases and from which can thereby be obtained as positive ions $(CH_3)_4N^+$, $(C_2H_5)_4N^+$ or the like is preferable from the standpoint of securing a high electric conductivity. Further, a salt which releases and from which can thereby be obtained negative ions having a small formula weight is also preferable.

The proportional amount of the supporting electrolyte is preferably 0.2 mol to 1.5 mol, and more preferably 0.5 mol to 1.0 mol with respect to 1 kg of the non-aqueous electrolyte (soluble components).

When the proportional amount of the supporting electrolyte is less than 0.2 mol, sometimes sufficient electrical characteristics such as electric conductivity of the non-aqueous electrolyte cannot be ensured. When the proportional amount of the supporting electrolyte exceeds 1.5 mol, sometimes sufficient electrical characteristics such as electric conductivity of the non-aqueous electrolyte cannot be ensured because the viscosity of the non-aqueous electrolyte rises and sufficient mobility of the quaternary ammonium salt cannot be ensured.

Phosphazene Derivative (Compound)

It is necessary that the phosphazene derivative (compound) is a liquid solvent from the standpoint of improving the energy density level of the non-aqueous electrolyte electric double-layer capacitor.

In the first aspect, reasons why the non-aqueous electrolyte has a phosphazene derivative (compound) include the following.

Conventionally, aprotic solvents having a high permittivity such as carbonates (e.g., ethylene carbonates, propylene carbonates and the like), γ-butyrolactones, N,N-dimethylformamides, sulforan, 3-methyl sulforan and the like have been used as a solvent in the non-aqueous electrolyte. However, because these organic solvents are combustible solvents (e.g., a mixed solvent of ethylene carbonate and diethyl carbonate (specific volume: ethylene carbonate/diethyl carbonate=1/1) having a flash point of 39° C.), when the non-aqueous electrolyte electric double-layer capacitor is ignited due to the capacitor becoming exothermic or the like, the electrolyte catches flame, the flames spread across the surface of the electrolyte, and the risk of danger is high. Further, attendant to the non-aqueous electrolyte electric double-layer capacitor becoming exothermic, sometimes vaporization and decomposition of the non-aqueous electrolyte, which has the organic solvent as a base, due to heat or the like can generate gas which causes the non-aqueous electrolyte electric double-layer capacitor to burst or be ignited, whereby the non-aqueous electrolyte catches fire and flames spread over the surface of the non-aqueous electrolyte.

On the other hand, when the non-aqueous electrolyte has a phosphazene derivative, it becomes possible to lower the risk of the electrolyte catching fire and flames spreading across the surface of the electrolyte because generation of gas due to vaporization or decomposition of the electrolyte and bursting or ignition of the electric double-layer capacitor due to the generated gas are suppressed at a relatively low temperature. Moreover, even when an aprotic organic solvent is included in the electrolyte, it becomes difficult for the non-aqueous electrolyte electric double-layer capacitor to combust, and it becomes possible to suppress bursting of the non-aqueous electrolyte electric double-layer capacitor and outbreak and spreading of fire because the aprotic organic solvent coexists with the phosphazene derivative.

In the second through fourth aspects, reasons why the non-aqueous electrolyte has a phosphazene derivative include the following.

Conventionally, in a non-aqueous solvent having as a base an aprotic organic solvent used in a non-aqueous electrolyte in a non-aqueous electrolyte electric double-layer capacitor, sometimes when a large electric current is abruptly released when a short-circuit occurs and the capacitor becomes abnormally exothermic, the electrolyte vaporizes and decomposes, gas is generated, and the capacitor bursts/catches fire due to the generated gas or heat. The risk of danger is therefore high. However, when a phosphazene derivative is included in these conventional non-aqueous electrolytes, it becomes possible to reduce such risks since excellent self-extinguishability or incombustibility is made manifest in the non-aqueous electrolyte by the action of nitrogen gas, halogen gas or the like derived from the phosphazene derivative.

Flash Point

In the first through fourth aspects, the flash point is preferably 100° C. or higher, more preferably 150° C. or higher, and even more preferably 180° C. or higher.

When the flash point is 100° C. or higher, ignition of the electric double-layer capacitor is suppressed, and even if an outbreak of fire occurs in an inner portion of the electric double-layer capacitor, it becomes possible to lower the danger of the flames spreading across the surface of the electrolyte and the efficacy of the present invention is demonstrated.

Specifically, by flash point in the present invention is meant the temperature at which flames spread across the surface of the substance such that at least 75% of the surface of the substance is covered. The flash point becomes an indicator of the forming ease of a mixture of air and vaporized gas of a combustible material, and can be measured with a Miniflash method described below.

In a sealed cup system, a device (an automatic flash measuring device) (Miniflash, manufactured by Grabner Instruments) equipped with a 4ml small measurement chamber, a heating cup, a frame, an ignition portion and an automatic frame perception system is prepared. 1 ml of the sample to be measured is placed in the heating cup, covered, and heating of the heating cup from the upper portion of the cover is commenced. The temperature of the sample is raised at fixed intervals until the mixture of air and vaporized gas inside the cup is ignited at a fixed temperature interval, ignition is detected, and the temperature at the time ignition is detected is acknowledged as the flash point.

Potential Window

In the second aspect, a lower limit of the potential window of the phosphazene derivative is +0.5V or lower and an ;upper limit of the same is +4.5V or higher. It is important that the potential window of the organic solvent has a wider range than the potential window of the phosphazene derivative.

By potential window is meant a range of voltage within which an electrochemical reaction does not occur at an applied voltage. Here, potential window refers to the positive/negative electrode contrast voltages.

It is preferable that the potential window is within a range having a lower limit of 0V or lower and an upper limit of +5. or higher, and even more preferable that the potential window is within a range having a lower limit of −0.5V to 0V and an upper limit of 5V to 8.5V. In the present invention, any numerical value range formed of a combination of any upper limit and any lower limit is acceptable as long as it is within the range described above.

When the lower limit of the potential window exceeds +0.5V or when the upper limit of the same is lower than +4.5V, attendant to the charge/discharge of the non-aqueous electrolyte electric double-layer capacitor, the non-aqueous electrolyte itself causes electrolysis, the life of the non-aqueous electrolyte electric double-layer capacitor becomes short, and dangers arise such as the potential for the non-aqueous electrolyte electric double-layer capacitor to explode due to generated gas because the numerical value range of the potential window becomes narrow.

In contrast, when the lower and upper limits of the potential window are within the preferred numerical range described above, the non-aqueous electrolyte is stable with respect to the voltage applied at the time of charge/discharge. Therefore, the non-aqueous electrolyte remains stable over a long period of time, has a long life, and there is no danger of the non-aqueous electrolyte electric double-layer capacitor exploding. Further, the non-aqueous electrolyte electric double-layer capacitor becomes electrochemically stable; that is, it does not cause an electrochemical reaction within the range of applied voltage.

The value of the potential window is obtained by measuring the value under the following conditions: a cyclic voltameter (manufactured by Solartron Co.) is used, Pt is used as a working electrode, Pt is used as a counter electrode, Li metal is used as a reference electrode, tetra-ethyl-ammonium-tetra-fluoro-borate (produced by Aldrich Co.) (amount added: 1 mol/l) is used as a supporting electrolyte, and the scanning potential is 10 mV/ sec.

Electric Conductivity

In the third aspect, it is necessary that the electric conductivity of the phosphazene derivative is 2.0 mS/cm or higher as the electric conductivity of the quaternary ammonium salt electrolyte of 0.5 mol/l density, and preferable that the electric conductivity of the phosphazene derivative is 4.0 mS/cm to 30 mS/cm or higher.

When the electric conductivity is lower than 2.0 mS/cm, the charge/discharge amounts and the like become small because a sufficient conductivity required of the electric double-layer capacitor cannot be secured. When the electric conductivity is 2.0 mS/cm or higher, the internal resistance of the non-aqueous electrolyte electric double-layer capacitor can be suppressed because a sufficient conductivity required of the electric double-layer capacitor can be secured, and therefore fall of potential/rise of potential can be suppressed.

The value of electric conductivity is obtained by using an electric conductivity meter (product name: CDM210, manufactured by Radio Meter Trading Co.) to measure the value while a 5 mA continuous current is applied to the non-aqueous electrolyte electric double-layer capacitor at a temperature of 25° C.

Relative Permittivity

In the fourth aspect, it is necessary that the relative permittivity in the phosphazene derivative at a temperature of 25° C. is 15 or higher. It is preferable that the relative permittivity is 15 to 90 and even more preferably 30 to 90.

When the relative permittivity is lower than 15, it becomes difficult for the supporting electrolyte of the quaternary ammonium and the like to dissociate and the number of free ions in the non-aqueous electrolyte decreases. As a result, a sufficient electric conductivity cannot be given to the non-aqueous electrolyte, and the charge/discharge amount of the non-aqueous electrolyte electric double-layer capacitor becomes small.

Using an impedance analyzer (function generator, manufactured by Solartron Co.), the value of relative permittivity is obtained by measuring the value with a parallel flat plate condenser electrode with the following method of measurement at the following conditions. Using a stainless parallel flat plate condenser electrode unit of 3 ml capacity, the condenser capacity (Co, C respectively) is measured at the time that the amount of the non-aqueous electrolyte is 0 ml and at the time that 3 ml of the non-aqueous electrolyte has been filled. Here, $\epsilon = \epsilon \cdot S/d$, $Co = \epsilon o \cdot S/d$, and the relative permittivity can be determined from the formula $\epsilon r = \epsilon/\epsilon o = C/Co$.

Viscosity

In the first through third aspects, the viscosity of the phosphazene derivative at a temperature of 25° C. is preferably 100 mPa·s (100 cP) or lower, more preferably 20 mPa·s (20 cP) or lower, and even more preferably 10 mPa·s (10 cP) from the standpoint of lowering the viscosity of the non-aqueous electrolyte.

When the viscosity exceeds 100 cP, as already mentioned in the explanation of the quaternary ammonium salt, because the viscosity of the non-aqueous electrolyte rises and sufficient mobility of the quaternary ammonium salt cannot be secured, a sufficient electric conductivity of the non-aqueous electrolyte cannot be ensured and charge/discharge characteristics may be impeded.

In the fourth aspect, it is necessary that the viscosity of the phosphazene derivative at a temperature of 25° C. is 20mPa·s (20 cP) or lower, preferably 10 mPa·s (10 cP) or lower, and more preferably 5 mPa·s (5 cP).

When the viscosity is within the aforementioned numerical range, a sufficient electric conductivity can be given to the non-aqueous electrolyte even if other solvents of low viscosity are used together, and a non-aqueous electrolyte electric double-layer capacitor having long-term stability can be manufactured easily.

In the present invention, the viscosity is measured at 120-second intervals at respective rotational speeds of 1 rpm, 2 rpm, 3 rpm, 5 rpm, 7 rpm, 10 rpm, 20 rpm and 50 rpm using a viscometer (R-model viscometer Model RE500-SL, manufactured by Tôki Sangyô, Ltd.). The viscosity can be determined by taking as an analytical condition the rotational speed at the time the designated value becomes 50% to 60% and measuring the viscosity at that time.

Incorporated Amount

In the first aspect, the amount of the phosphazene derivative in the non-aqueous electrolyte is preferably 20% to 90% and more preferably 40% to 75%.

When the amount is less than 20%, sometimes the effect of suppressing the bursting or ignition of the non-aqueous electrolyte electric double-layer capacitor becomes insufficient. When the amount exceeds 90%, sometimes the viscosity of the non-aqueous electrolyte increases and it becomes difficult to obtain electric conductivity, since it approximates a case in which a phosphazene derivative is used solely. Further, sometimes performance becomes insufficient when used at a temperature below freezing point.

In the second and third aspects, the amount of the phosphazene derivative in the non-aqueous electrolyte is preferably 20 vol. % or more and more preferably 30 vol. % or more. There are no particular limitations on the upper limit of the amount of the phosphazene derivative. 100 vol. % of the non-aqueous electrolyte may even be the phosphazene derivative.

When the amount is less than 20 vol. %, sometimes the self-extinguishability is insufficient. When the amount is more than 30 vol. %, it becomes possible for the non-aqueous electrolyte to manifest a sufficient incombustibility.

In the present invention, "self-extinguishable" refers, in the "Evaluation of Self-Extinguishability or Incombustibility" described below, to a property in which an ignited flame is extinguished at a 25 mm to 100 mm line and which achieves a state in which even deposits cannot catch flame. "Incombustible" refers, in the "Evaluation of Self-Extinguishability or Incombustibility" described below, to a property in which an ignited flame does not reach a 25 mm line and which achieves a state in which even deposits cannot catch flame.

Evaluation of self-extinguishability and incombustibility is conducted by measuring and evaluating the burning action of an ignited flame in an atmospheric environment using a method in which a UL94HB testing method of UL (Underwriting Laboratory) specifications has been arranged. Ignitability, combustibility, generation of carbides and the phenomenon of second ignition are observed, and in conformity with UL94HB testing method standards a specimen of 127 mm×12.7 mm is used as the sample. A noncombustible quartz fiber is used for the preparation of the specimen, and various types of electrolytes of 1 ml are instilled therein.

Molecular Structure

It is preferable that a substituent having a halogen element is included within the molecular structure as the phosphazene derivative. When a substituent having a halogen element is included within the molecular structure, self-extinguishability or incombustibility can more effectively be made manifest in the non-aqueous electrolyte by halogen gas derived from the phosphazene derivative, even for an amount less than that within the numerical value range of the amount of the phosphazene derivative.

Although generation of a halogen radical can sometimes become a problem in regard to a compound in which a halogen element is included in a substituent, such problems do not arise with the phosphazene derivative in the present invention because the phosphorus element within the molecular structure arrests the halogen radical to form a stable phosphorous halide.

Moreover, when the phosphazene derivative includes within the molecular structure a substituent having a halogen element, each of the lower and upper limits of the potential window shifts somewhat in the positive direction, but it can be reasoned that this presents no particular problem in terms of potential.

The amount of the halogen element in the phosphazene derivative is preferably 2 wt. % to 80 wt. %, more preferably 2 wt. % to 60 wt. %, and even more preferably 2 wt. % to 50 wt. %.

When the amount is less than 2 wt. %, sometimes the marked effect of adding the halogen cannot be obtained, and when the amount exceeds 80 wt. %, sometimes the phosphazene derivative becomes highly viscous and electrical characteristics such as electric conductivity and the like deteriorate.

Fluorine, chlorine, bromine and the like may be suitable for the halogen element, but fluorine is preferable among these in particular.

From the perspective of the conductivity of the non-aqueous electrolyte, there are no particular limitations on the phosphazene derivative, particularly in the third aspect, as long as it is a liquid at an ordinary temperature of 25° C. However, particularly in the second aspect, from the perspective of further expanding within the numerical value range of the window potential, the chain phosphazene derivative indicated by the general formula (1) or the ring phosphazene derivative indicated by the general formula (2) below may be suitably used. In the fourth aspect, the chain phosphazene derivative indicated by the general formula (1) may be suitably used.

In the fourth aspect, because ordinarily there are many cases in which a solvent having a high relative permittivity has a high viscosity, to use the solvent in the non-aqueous electrolyte, it is necessary to incorporate at a predetermined amount a co-solvent having a low viscosity in order to lower the viscosity of the non-aqueous electrolyte. In contrast, the phosphazene derivative used in the present invention has a high relative permittivity and a low viscosity. Therefore, there is no particular need to use another co-solvent in order to lower the viscosity. For this reason, preparation of the non-aqueous electrolyte is easy and layer separation of the solvent and the like does not occur. Consequently, it becomes possible to manufacture a non-aqueous electrolyte electric double-layer capacitor that is stable over a long period of time.

General Formula (1)

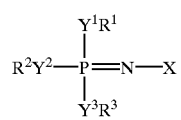

Gereral Formula (1)

In the general formula (1), $R^1$, $R^2$ and $R^3$ indicate monovalent substituents or halogen elements. X indicates a group which has at least one type of element chosen from a group of carbon, silicon, germanium, tin, nitrogen, phosphorus, arsenic, antimony, bismuth, oxygen, sulfur, selenium, tellurium and polonium. $Y^1$, $Y^2$ and $Y^3$ are bivalent combination groups, bivalent elements or single bonds.

General Formula (2)

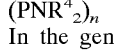

In the general formula (2), $R^4$ indicates a monovalent substituent or a halogen element. n indicates 3 to 15.

In the general formula (1), there are no particular limitations on $R^1$, $R^2$ and $R^3$ and may be appropriately selected as long as they are monovalent substituents or halogen elements.

Examples of the monovalent substituent include alkoxy groups, alkyl groups, carboxyl groups, acyl groups and aryl groups. For the halogen element, those previously cited may be suitably used. Particularly in terms of lowering the viscosity of the non-aqueous electrolyte, alkoxy groups are preferable among these. $R^1$ through $R^3$ may be the same substituent group or may be different substituent groups.

Examples of the alkoxy group include methoxy groups, ethoxy groups, propoxyy groups, butoxy groups and the like, or alkoxy substituent alkoxy groups such as methoxyethoxy groups and methoxyethoxyethoxy groups. Among these, it is preferable that $R^1$ through $R^3$ are all methoxy groups, ethoxy groups, methoxyethoxy groups or methoxyethoxyethoxy groups. In terms of low viscosity and high permittivity, it is preferable that $R^1$ through $R^3$ in the third aspect are all methoxy groups, ethoxy groups, or groups in which one or more hydrogen atom in the methoxy groups or ethoxy groups is replaced by fluorine. In the second aspect, it is preferable that $R^1$ through $R^3$ are all methoxy groups or ethoxy groups.

Examples of the alkyl group include methyl groups, ethyl groups, propyl groups, butyl groups and pentyl groups.

Examples of the acyl group include formyl groups, acetyl groups, propionyl groups, butyryl groups, isobutyryl groups, valeryl groups and the like.

Examples of the aryl group include phenyl groups, tolyl groups and naphthyl groups.

As described above, the hydrogen elements within these substituent groups are preferably substituted by a halogen element.

In addition to a $CH_2$ group, groups indicated by $Y^1$, $Y^2$ and $Y^3$ in the general formula (1) may be groups which have an element such as oxygen, sulfur, selenium, nitrogen, boron, aluminium, scandium, gallium, yttrium, indium, lanthanum, thallium, carbon, silicon, titanium, tin, germanium, zirconium, lead, phosphorous, vanadium, arsenic, niobium, antimony, tantalum, bismuth, chromium, molybdenum, tellurium, polonium, tungsten, iron, cobalt and nickel. Preferable among these are the $CH_2$ group and a group having a carbon, sulfur, selenium or nitrogen element. It is particularly preferable that $Y^1$, $Y^2$ and $Y^3$ have a sulfur or selenium element because the incombustibility of the non-aqueous electrolyte is markedly improved. $Y^1$ through $Y^3$ may be the same group or may be different groups.

In the general formula (1), from the perspective of consideration of the environment and harmful potential thereto, it is preferable that X is an organic group having at least one type of element chosen from a group of carbon, silicon, nitrogen, phosphorous, carbon and sulfur. It is even more preferable if X is a group having a structure represented by general formula (3) below.

General Formula (3)

General Formula (3)

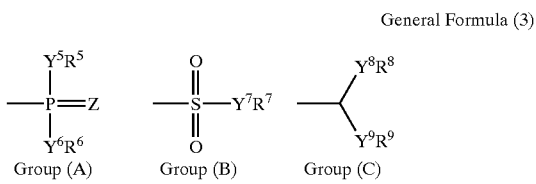

Group (A)   Group (B)   Group (C)

In the general formula (3), $R^5$ through $R^9$ indicate monovalent substituents or halogen elements. $Y^5$ through $Y^9$ indicate bivalent combination groups, bivalent elements or single bonds. Z indicates a bivalent group or a bivalent element.

In the general formula (3), monovalent substituents or halogen elements similar to those already described for $R^1$ through $R^3$ in the general formula (1) may be suitable used for $R^5$ through $R^9$. In the same organic group, these may be mutually identical or mutually different. $R^5$ and $R^6$, and $R^8$ and $R^9$ may be bonded to one another to form a ring.

In the general formula (3), groups indicated by $Y^5$ to $Y^9$ may be bivalent combination groups or bivalent groups similar to those already described for $Y^1$ through $Y^3$ in the general formula (1). Similarly, it is particularly preferable that $Y^5$ through $Y^9$ have a sulfur or selenium element because the incombustibility of the non-aqueous electrolyte is markedly improved. In the same organic group, they may be mutually identical or mutually different.

In addition to a $CH_2$ group, a CHR group (R represents an alkyl group, an alkoxyl group, a phenyl group or the like; same below) and an NR group, examples of Z in the general formula (3). include a group having an element such as carbon, sulfur, selenium, boron, aluminium, scandium, gallium, yttrium, indium, lanthanum, thallium, carbon, silicon, titanium, tin, germanium, zirconium, lead, phosphorous, vanadium, arsenic, niobium, antimony, tantalum, bismuth, chromium, molybdenum, tellurium, polonium, tungsten, iron, cobalt, nickel and the like.

Preferable among these are the $CH_2$ group, the CHR group, the NR group, and groups having a carbon, sulfur, or selenium element. Groups having a sulfur or selenium element are preferable in particular because the incombustibility of the non-aqueous electrolyte is markedly improved.

In the general formula (3), a group having phosphorous such as the one indicated by group (A) is particularly preferable in terms of effective inflammability, self-extinguishability or incombustibility, and a group having sulfur such as the one indicated by group (B) is particularly preferable in terms of lowering the surface resistance of the non-aqueous electrolyte.

With respect to the aspects 1 through 3, there are no particular limitations on $R^4$ in the general formula (2) and may be appropriately selected as long as $R^4$ is a monovalent substituent or halogen element. Alkoxy groups, alkyl groups, carboxyl groups, acyl groups, alyl groups and the like may be used as the monovalent substituent. Previously described halogen elements may be suitably used for the halogen element. Among these, alkoxy groups are particularly preferable in terms of lowering the viscosity of the non-aqueous electrolyte.

Examples of alkoxy groups include methoxy groups, ethoxy groups, methoxyethoxy groups, propoxy groups, phenoxy groups and the like. Among these, methoxy groups, ethoxy groups and methoxyethoxy groups are particularly preferable.

As described above, the hydrogen elements within these substituent groups are preferably substituted by a halogen element.

In the first through third aspects, by appropriately selecting $R^1$ through $R^9$, $Y^1$ through $Y^3$, $Y^5$ through $Y^9$ and Z in the general formulas (1) through (3), it becomes possible to synthesize a non-aqueous electrolyte having a more desirable viscosity, solubility and the like, and particularly in the second aspect, and it becomes possible to prepare a non-aqueous electrolyte electric double-layer capacitor having a potential window within a more suitable numerical value range.

In the fourth aspect, by appropriately selecting $R^1$ through $R^8$, $Y^1$ through $Y^8$ and Z in the general formulae (1) through (3), it becomes possible to synthesize a non-aqueous electrolyte having a more favorable viscosity and conductivity. However, among these, it is necessary to use a phosphazene derivative having a low viscosity and high permittivity, and from this standpoint the phosphazene derivative indicated by the general formula (4) below is more preferable.

General Formula (4)

General Formula (4)

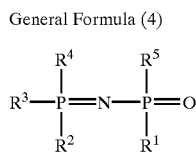

In the general formula (4), $R^1$, $R^2$, $R^3$, $R^4$ and $R^5$ indicate alkoxy groups 1 to 8 carbon atoms or groups having ether bonding.

Examples of the alkoxy group include methoxy groups, ethoxy groups, propoxy groups, butoxy groups and the like.

Examples of the groups having ether bonding include alkoxy group substitution alkoxy groups such as methoxyethoxy groups, methoxyethoxyethoxy groups and the like.

Among these, from the standpoint of low viscosity and high permittivity, it is particularly preferable that all are methoxy groups or all are ethoxy groups.

In the general formula (4), it is preferable that the hydrogen elements within alkoxy groups or groups having ether bonds are substituted with a halogen element.

One type of the phosphazene derivative may be used alone, or two or more types of the phosphazene derivative may be used in combination.

Organic Solvent

The organic solvent in the second aspect is included as an essential component in the non-aqueous electrolyte, and the organic solvent in the first and third aspects is appropriately included as another component in the non-aqueous electrolyte.

From the standpoint of safety, the organic solvent is preferably an aprotic organic solvent.

When an aprotic organic solvent is incorporated in the non-aqueous electrolyte, it is possible to obtain high safety without a reaction with the materials of the negative electrode. It also becomes possible to lower the viscosity of the non-aqueous electrolyte land easily achieve an optimum ion conductivity and electric conductivity of the non-aqueous electrolyte electric double-layer capacitor.

There are no particular limitations on the aprotic organic solvent. For example, ether compounds and ester compounds may be used. Specific examples which can be suitably used include 1,2-dimethoxyethane, tetrahydrofuran, dimethyl carbonate, diethyl carbonate, ethylmethyl carbonate, ethylen carbonate, propylene carbonate, diphenyl carbonate, γ-butyrolactone, γ-valerolactone, sulforan, N,N-dimethyl formamide (DMF), acetonitrile (AN) and the like.

Among these, ring ester compounds such as ethylene carbonate, propylene carbonate and γ-butyrolactone, and chain ester compounds such as 1,2-dimethoxyethane, dimethyl carbonate, diethyl carbonate, ethylmethyl carbonate and the like are suitable.

Ring ester compounds are particularly suitable in terms of having a high relative permittivity and an excellent dissolution in the supporting electrolyte. Chain ester compounds are particularly suitable in terms of having a low viscosity and being extremely effective in lowering viscosity.

One type may be used singly, or two or more types may be used in combination.

In the first aspect, in terms of lowering the viscosity of the non-aqueous electrolyte, a viscosity of the aprotic organic solvent at a temperature of 25° C. is preferably 2.5 mPa·s (2.5 cP) or lower, and more preferably 2.0 mPa·s (2.0 cP).

In the second and third aspects, in terms of lowering the viscosity of the non-aqueous electrolyte, a viscosity of the aprotic organic solvent at a temperature of 25° C. is preferably 10 mPa·s (10 cP) or lower, and more preferably 5 mPa·s (5 cP).

The proportional amount of the aprotic organic solvent in the non-aqueous electrolyte is 10% to 75%, and more preferably 25% to 60%, at a volume percent.

When the proportional amount is less than 10%, the viscosity of the non-aqueous electrolyte cannot be lowered, and when the proportional amount exceeds 75%, sometimes the combustibility of the non-aqueous electrolyte rises.

In the first through fourth aspects, the flash point of the non-aqueous electrolyte is preferably 100° C. or higher, more preferably 150° C. or higher, and even more preferably 180° C. or higher. The method of measuring the flash point is as described above.

Other Materials

In addition to the materials above, a separator, a collector and a housing may be used.

The purpose of the separator is to prevent short-circuiting and the like of the non-aqueous electrolyte electric double-layer capacitor, and the separator is intervened between the positive and negative electrodes. There are no particular restrictions on the separator. Widely known separators ordinarily used as separators for non-aqueous electrolyte electric double-layer capacitors are suitably used. Examples of the separator include microporous film, nonwoven fabric, paper and the like. Specifically, a nonwoven cloth or a thin-layer film formed of a synthetic resin such as polytetrafluoroethylene, polypropylene or polyethylene may be suitably used.

Among these, a microporous film formed of polypropylene or polyethylene having a width of about 20 μm to about 50 μm is particularly suitable.

There are no particular limitations on the collector. The collector can be suitably chosen from among widely known collectors ordinarily used as collectors for non-aqueous electrolyte electric double-layer capacitors. A collector that is electrochemically corrosion-resistant, chemically corrosion-resistant, has excellent workability and excellent mechanical strength, and which is inexpensive is preferable. For example, collector layers and the like such as aluminium, stainless steel, conductive resins and the like are preferable.

There are no particular limitations on the housing. Widely known housings ordinarily used as housings for non-aqueous electrolyte electric double-layer capacitors are suitably used. Suitable materials for the housing include aluminium, stainless steel, conductive resins and the like.

In addition to materials cited above for the separator, the collector and the housing, other materials include widely known materials ordinarily used in non-aqueous electrolyte electric double-layer capacitors.

There are no particular limitations on forms of the non-aqueous electrolyte electric double-layer capacitor described above. Well-known forms such as cylinder models (smooth cylindrical models or angled models), flat models (coin models) and the like may be suitably used.

The internal resistance (Ω) of the non-aqueous electrolyte electric double-layer capacitor is preferably 0.1 to 0.3 (Ω) and more preferably 0.1 to 0.25 (Ω).

The internal resistance (Ω) may be obtained in accordance with well-known methods of measuring internal resistance.

For example, the charge/discharge curve may be measured, and the potential amplitude accompanying the charge or the discharge rest may be measured at that time.

The charge/discharge amount (mAh/g) of the non-aqueous electrolyte electric double-layer capacitor is preferably about 140 mAh/g to about 145 mAh/g and more preferably about 143 mAh/g to about 145 mAh/g.

The charge/discharge amount can be measured in accordance with well-known methods of measurement.

The non-aqueous electrolyte electric double-layer capacitor may be suitably used as a memory back-up for various types of electronic devices, industrial equipment, air navigation instruments and the like, as an electromagnetic hold for toys, cordless devices, gas devices, instantaneous water heaters and the like, and as an electrical power supply for timepieces such as wristwatches, wall clocks, solar clocks and AGS wristwatches.

According to the non-aqueous electrolyte electric double-layer capacitor of the first aspect, there is excellent safety because there is no danger of ignition and no danger of bursting or catching flame at the time of short-circuit, sufficient electric conductivity is maintained, surface resistance of the non-aqueous electrolyte is low, and properties at low temperatures are superior.

According to the non-aqueous electrolyte electric double-layer capacitor of the second aspect, long-term stability and safety necessary as a capacitor is maintained, self-extinguishability or incombustibility is excellent, electrochemically stability is ensured, resistance to deterioration is ensured, the surface resistance of the non-aqueous electrolyte is low, and properties at low temperatures are superior.

According to the non-aqueous electrolyte electric double-layer capacitor of the third aspect, long-term stability and safety necessary as a capacitor is maintained, self-extinguishability or incombustibility is excellent, resistance to deterioration is ensured, the surface resistance of the non-aqueous electrolyte is low, and properties at low temperatures are excellent.

According to the non-aqueous electrolyte electric double-layer capacitor of the fourth aspect, various properties such as charge/discharge amounts necessary as an electric double-layer capacitor are maintained, self-extinguishability or incombustibility is excellent, the surface resistance of the non-aqueous electrolyte is low, and by using only a phosphazene derivative as a solvent long-term stability is superior, is produced easily, and properties at low temperatures are excellent.

EXAMPLES

The present invention will hereinafter be explained with reference to Examples and Comparative Examples, but is not limited to the same.

In Examples pertaining to the first aspect, the flash point and viscosity of solutions were measured in accordance with previously mentioned methods which use an automatic flash measurement device (Miniflash, manufactured by Grabner Instruments) and a viscometer (R-model viscometer, Model RE500-SL, manufactured by Tôki Sangyô).

Example 1

Production of Positive Electrode and Negative Electrode (Polarizable Electrode)

Active carbon (product name: Kuractive-1500, manufactured by Kurare Chemical), acetylene black (conducting agent) and tetrafluoroethylene (PTFE) (binder) were mixed such that the mass ratio thereof was 8/1/1 (active carbon/acetylene black/tetrafluoroethylene) to obtain a mixture.

100 mg of the obtained mixture was extracted and placed in a 20 mmø pressure-proof carbon container, then compounded and formed at a pressure of 150 kgf/cm$^2$ and a temperature of 25° C. to produce the positive electrode and negative electrode (polarizable electrode).

Production of Non-Aqueous Electrolyte Electric Double-layer Capacitor

Cell Assembly

A cell was assembled using the obtained positive electrode and negative electrode, an aluminium metal plate (collector) (thickness: 0.3 mm) and a polypropylene/polyethylene film (cellguard #3501) (separator) (thickness: 25 μm), and sufficiently dried by vacuum drying.

Production of Non-Aqueous Electrolyte

Tetraethyl ammonium fluoroborate $(C_2H_5)_4N.BF_4$ (quaternary ammonium salt) was dissolved at a density of 0.5 mol/kg in 1 ml of a phosphazene derivative (chain EO-type phosphazene derivative (in the aforementioned general formula (1), a compound in which X has the structure of group (A) expressed by general formula (3), $Y^1$ to $Y^3$ and $Y^5$ to $Y^6$ are all single bonds, $R^1$ to $R^3$ and $R^5$ to $R^6$ are all ethoxy groups, and Z is oxygen)) (viscosity at 25° C.: 5.8 cP) to produce a non-aqueous electrolyte (flash point: 155° C.).

Production of Non-Aqueous Electrolyte Electric Double-layer Capacitor

The cell was impregnated in the non-aqueous electrolyte to produce a non-aqueous electrolyte electric double-layer capacitor.

Measurement of Electric Conductivity of Non-Aqueous Electrolyte Electric Double-layer Capacitor The electric conductivity was measured using an electric conductivity meter (product name: CDM210, manufactured by Radiometer Trading) while applying a 5 mA continuous current to the obtained non-aqueous electrolyte electric double-layer capacitor.: The electric conductivity at a temperature of 25° C. was 5.0 mS/cm.

As long as the electric conductivity of the non-aqueous electrolyte electric double-layer capacitor at a temperature of 25° C. is 5.0 mS/cm or higher, a level is achieved which presents no application problems.

Example 2

A non-aqueous electrolyte electric double-layer capacitor was produced in the same manner as that described in Example 1, except that 1 ml of γ-butyrolactone (aprotic organic solvent) (viscosity at 25° C.: 1.7 cP) was added in the production of the non-aqueous electrolyte to form a non-aqueous electrolyte (specific volume (phosphazene derivative/γ-butyrolactone)=1/1) (flash point: 100° C.). When the electric conductivity was measured in the same manner as described in Example 1, the electric conductivity at a temperature of 25° C. was 7.0 mS/cm.

Comparative Example 1

A non-aqueous electrolyte electric double-layer capacitor was produced in the same manner as that described in Example 1, except that in the production of the non-aqueous electrolyte, a mixed liquid of carbonic propylene and carbonic diethyl (specific volume (carbonic propylene/carbonic diethyl)=1/1) (flash point: 39° C.) (2 ml) was used instead of 1 ml of the phosphazene derivative (chain EO-type phosphazene derivative (in the aforementioned general formula (1), a compound in which X has the structure of group (A) expressed by general formula (3), $Y^1$ to $Y^3$ and $Y^5$ to $Y^6$ are all single bonds, $R^1$ to $R^3$ and $R^5$ to $R^6$ are all ethoxy groups, and Z is oxygen)). When the electric conductivity was measured in the same manner as described in Example 1, the electric conductivity at a temperature of 25° C. was 8 mS/cm.

These results are shown in Table 1.

TABLE 1

|  | Example 1 | Example 2 | Comparative Example 1 |
|---|---|---|---|
| Electric Conductivity (mS/cm) | 5.0 | 7.0 | 8.0 |
| FlashPoint (° C.) | 155.0 | 101.0 | 39.0 |

Because the flash point of the non-aqueous electrolyte was sufficiently high in Examples 1 and 2, the non-aqueous electrolyte electric double-layer capacitor of the first aspect of the present invention showed no danger of catching fire or danger of bursting or igniting at the time of short-circuit, and exhibited excellent safety. Particularly in Example 2, it is clear that the non-aqueous electrolyte electric double-layer capacitor of the first aspect of the present invention was remarkably superior in terms of the viscosity of the non-aqueous electrolyte being low, incombustibility and electric conductivity.

For the organic solvent in respective Examples pertaining to the second aspect below, an organic solvent having a potential window of a range wider than the potential window of the phosphazene derivative was used.

Example 3

Preparation of the Non-Aqueous Electrolyte 10 ml of a phosphazene derivative (chain EO-type phosphazene derivative (in the aforementioned general formula (1), a compound in which X has the structure of group (A) expressed by general formula (3), $Y^1$ to $Y^3$ and $Y^5$ to $Y^6$ are all single bonds, $R^1$ to $R^3$ and $R^5$ to $R^6$ are all ethoxy groups, and Z is oxygen), viscosity at 25° C.: 5.8 mPa·s (5.8 cP), flash point: 155° C.) was added (20 vo. %) to 40 ml of γ-butyrolactone (aprotic organic solvent, viscosity at 25° C.: 1.7 mPa·s (1.7 cP)), and then tetraethyl ammonium fluoroborate $(C_2H_5)_4N.BF_4$ (quaternary ammonium salt) was dissolved at a density of 0.5 mol/kg to produce a non-aqueous electrolyte. Evaluation of Self-Extinguishability or Incombustibility The non-aqueous electrolyte was evaluated as indicated below in the same manner as the aforementioned method of evaluating self-extinguishability or incombustibility. The results are shown in Table 2.
Evaluation of Incombustibility An evaluation of "incombustible" was recorded when an ignited flame did not reach a 25 mm line and material deposited from a net did not catch flame.
Evaluation of Self-Extinguishability An evaluation of "self-extinguishable" was recorded when an ignited flame was extinguished at a 25 mm to 100 mm line and material deposited from a net did not catch flame.
Evaluation of Combustibility An evaluation of "combustible" was recorded when an ignited flame passed a 100 mm line.

Production of Positive Electrode and Negative Electrode (Polarizable Electrode)

Active carbon (product name: Kuractive-1500, manufactured by Kurare Chemical), acetylene black (conducting agent) and tetrafluoroethylene (PTFE) (binder) were mixed such that the mass ratio thereof was 8/1/1 (active carbon/acetylene black/PTFE) to obtain a mixture.

100mg of the obtained mixture was extracted and placed in a 20 mmø pressure-proof carbon container, then compounded and formed at a pressure of 150 kgf/cm² and ordinary temperature to produce the positive electrode and negative electrode (polarizable electrode).

Production of Non-Aqueous Electrolyte Electric Double-layer Capacitor

A cell was assembled using the obtained positive electrode and negative electrode, an aluminium metal plate (collector) (thickness: 0.5 mm) and a polypropylene/polyethylene film (separator) (thickness: 25 μm), and sufficiently dried by vacuum drying.

The cell was impregnated in the non-aqueous electrolyte to produce a non-aqueous electrolyte electric double-layer capacitor.
Measurement of Potential Window The lower limit and upper limit of the potential window was measured under the aforementioned measurement conditions using the aforementioned cyclic voltameter. The results are shown in Table 2.
Evaluation of Capacitor Stability The stability of the obtained capacitor was evaluated by measuring internal resistance (Ω) before and after a 20 cycle charge/discharge in accordance with the following measurement of charge/discharge amounts. The results are shown in Table 2.
Measurement of Internal Resistance Internal resistance was calculated by measuring the potential amplitude accompanying the charge rest or the discharge rest at the time the charge/discharge curve of the obtained capacitor was measured.
Measurement and Evaluation of Electrochemical Safety Electrochemical safety was measured and evaluated by respectively setting the positive electrode to 5V and the negative electrode to 1V, and then measuring with an NMR and a GL-MS at this potential the decomposition of the electrolyte after three hours of having been energized.

Example 4

A non-aqueous electrolyte electric double-layer capacitor was produced in the same manner as that described in Example 3, except that the amount of γ-butyrolactone was altered to 10 ml in the production of the non-aqueous electrolyte, and the amount of the phosphazene derivative (chain EO-type phosphazene derivative (in the aforementioned general formula (1), a compound in which X has the structure of group (A) expressed by general formula (3), $Y^1$ to $Y^3$ and $Y^5$ to $Y^6$ are all single bonds, $R^1$ to $R^3$ and $R^5$ to $R^6$ are all ethoxy groups, and Z is oxygen)) was altered to 40 ml (80 vol. %). Self-extinguishability or incombustibility was then evaluated. Further, the non-aqueous electrolyte electric double-layer capacitor was produced in the same manner as that of Example 3, and measurement of the potential window, and measurement and evaluation of capacitor stability and electrochemical stability were conducted. The results are shown in Table 2.

Example 5

A non-aqueous electrolyte electric double-layer capacitor was produced in the same manner as that described in Example 4, except that the phosphazene derivative was replaced with a compound in which the hydrogen element within the alkoxy group in the phosphazene derivative (chain EO-type phosphazene derivative (in the aforementioned general formula (1), a compound in which X has the structure of group (A) expressed by general formula (3), $Y^1$ to $Y^3$ and $Y^5$ to $Y^6$ are all single bonds, $R^1$ to $R^3$ and $R^1$ to $R^6$ are all ethoxy groups, and Z is oxygen)) was substituted by fluorine in the production of the non-aqueous electrolyte. Self-extinguishability or incombustibility was then evaluated. Further, the non-aqueous electrolyte electric double-layer capacitor was produced in the same manner as that of Example 4, and measurement and evaluation of the potential window, and measurement and evaluation of capacitor stability and electrochemical stability were conducted. The results are shown in Table 2.

Comparative Example 2

A non-aqueous electrolyte electric double-layer capacitor was produced in the same manner as that described in Example 3, except that the phosphazene derivative (chain EO-type phosphazene derivative (in the aforementioned general formula (1), a compound in which X has the structure of group (A) expressed by general formula (3), $Y^1$ to $Y^3$ and $Y^5$ to $Y^6$ are all single bonds, $R^1$ to $R^3$ and $R^5$ to $R^6$ are all ethoxy groups, and Z is oxygen)) was not used in the production of the non-aqueous electrolyte. Self-extinguishability or incombustibility was then evaluated. Further, the non-aqueous electrolyte electric double-layer capacitor was produced in the same manner as that of Example 3, and measurement and evaluation of the potential window, and measurement and evaluation of capacitor stability and electrochemical stability were conducted. The results are shown in Table 2.

(1), a compound in which X has the structure of group (A) expressed by general formula (3), $Y^1$ to $Y^3$ and $Y^5$ to $Y^6$ are all single bonds, $R^1$ to $R^3$ and $R^5$ to $R^6$ are all ethoxy groups, and Z is oxygen, flash point: 155° C.)) was added (20 vol. %) to 80 ml of γ-butyrolactone (aprotic organic solvent, viscosity at 250 C: 1.7 mPa·s (1.7 cP)), and then tetraethyl ammonium fluoroborate $(C_2H_5)_4N.BF_4$ (quaternary ammonium salt) was dissolved at a density of 0.5 mol/kg to produce a non-aqueous electrolyte.

When the electric conductivity of the 0.5 mol/l quaternary ammonium salt electrolyte of the phosphazene derivative used in the present example was measured in the same manner as described above, the electric conductivity was 7.5 mS/cm.

Evaluation of Self-Extinguishability of Incombustibility

The obtained non-aqueous electrolyte was evaluated as indicated below in the same manner as the aforementioned method of evaluating self-extinguishability or incombustibility. The results are shown in Table 3.

Evaluation of Incombustibility

An evaluation of "incombustible" was recorded when an ignited flame did not reach a 25 mm line and material deposited from a net did not catch flame.

Evaluation of Self-Extinguishability

An evaluation of "self-extinguishable" was recorded when an ignited flame was extinguished at a 25 mm to 100 mm line and material deposited from a net did not catch flame.

Evaluation of Combustibility

An evaluation of "combustible" was recorded when an ignited flame passed a 100 mm line.

Production of Positive Electrode and Negative Electrode (Polarizable Electrode)

Active carbon (product name: Kuractive-1500, manufactured by Kurare Chemical), acetylene black (conducting agent) and tetrafluoroethylene (PTFE) (binder) were mixed such that the mass ratio thereof was 8/1/1 (active carbon/acetylene black/PTFE) to obtain a mixture.

TABLE 2

| | Evaluation of Potential Window (V) | | Evaluation of Battery Stability (Internal Resistance (Ω)) | | Evaluation of Self-Extinguishability or Incombustibility | Evaluation of Electrochemical Stability |
|---|---|---|---|---|---|---|
| | Lower Limit | Upper Limit | Initial | After 50-Cycle Charge/Discharge | | |
| Example 3 | −0.5 | +6.5 | 0.20 | 0.20 | Self-Extinguishable | Stable |
| Example 4 | −0.5 | +6.5 | 0.22 | 0.22 | Incombustible | Stable |
| Example 5 | 0 | +6.8 | 0.21 | 0.21 | Incombustible | Stable |
| Comparative Example 2 | +0.5 | +8.5 | 0.19 | 0.19 | Combustible | Unstable*[1] |

*[1]: change in a portion of γ-valerolactone

In Examples 3 to 5, it is clear that the self-extinguishability or incombustibility of the non-aqueous electrolyte was superior, and that the non-aqueous electrolyte electric double-layer capacitor of the second aspect was superior in long-term stability and electrochemical stability.

In Examples pertaining to the third aspect below, the viscosity of the solution was measured with the aforementioned method using the aforementioned viscometer (R-model viscometer Model RE500-SL, manufactured by Tôki Sangyô, Ltd.).

Example 6
Production of Non-Aqueous Electrolyte 20 ml of a phosphazene derivative (chain EO-type phosphazene derivative (in the aforementioned general formula 100 mg of the obtained mixture was extracted and placed in a 20 mmø pressure-proof carbon container, then compounded and formed at a pressure of 150 kgf/cm² and ordinary temperature to produce the positive electrode and negative electrode (polarizable electrode).

Production of Non-Aqueous Electrolyte Electric Double-layer Capacitor

A cell was assembled using the obtained positive electrode and negative electrode, an aluminium metal plate (collector) (thickness: 0.3 mm) and a polypropylene/polyethylene film (cellguard #3501) (separator) (thickness: 25 μm), and sufficiently dried by vacuum drying.

The cell was impregnated in the non-aqueous electrolyte to produce a non-aqueous electrolyte electric double-layer capacitor.

Evaluation of Internal Resistance

With regard to the obtained non-aqueous electrolyte electric double-layer capacitor, internal resistance after a 50-cycle charge/discharge was measured in the same manner as the aforementioned method of measuring internal resistance. The results are shown in Table 3.

Example 7

A non-aqueous electrolyte was produced in the same manner as that described in Example 6, except that in the production of the non-aqueous electrolyte, the aforementioned phosphazene derivative (chain EO-type phosphazene derivative (in the aforementioned general formula (1), a compound in which X has the structure of group (A) expressed by general formula (3), $Y^1$ to $Y^3$ and $Y^5$ to $Y^6$ are all single bonds, $R^1$ to $R^3$ and $R^5$ to $R^6$ are all ethoxy groups, and Z is oxygen)), was replaced with a phosphazene derivative (chain MO-type phosphazene derivative (in the aforementioned general formula (1), a compound in which X has the structure of group (A) expressed by general formula (3), $Y^1$ to $Y^3$ and $Y^5$ to $Y^6$ are all single bonds, $R^1$ to $R^3$ and $R^5$ to $R^6$ are all methoxy groups, and Z is oxygen, flash point: 150° C.)), and the self-extinguishability or incombustibility were evaluated.

When the electric conductivity of the 0.5 mol/l quaternary ammonium salt electrolyte of the phosphazene derivative used in the present example was measured in the same manner as described above, the electric conductivity was 4.8 mS/cm.

Further, a non-aqueous electrolyte electric double-layer capacitor was produced in the same manner as that of Example 6, and the internal resistance was measured. The results are shown in Table 3.

Example 8

A non-aqueous electrolyte was produced in the same manner as that described in Example 6, except that in the production of the non-aqueous electrolyte, 20 vol. % of the aforementioned phosphazene derivative (chain EO-type phosphazene derivative (in the aforementioned general formula (1), a compound in which X has the structure of group (A) expressed by general formula (3), $Y^1$ to $Y^3$ and $Y^5$ to $Y^6$ are all single bonds, $R^1$ to $R^3$ and $R^5$ to $R^6$ are all ethoxy groups, and Z is oxygen)) was replaced with 60 vol. % of a phosphazene derivative (flash point: 257° C.) in which the hydrogen element within the ethoxy group in the phosphazene derivative (chain EO-type phosphazene derivative (in the aforementioned general formula (1), a compound in which X has the structure of group (A) expressed by general formula (3), $Y^1$ to $Y^3$ and $Y^5$ to $Y^6$ are all single bonds, $R^1$ to $R^3$ and $R^1$ to $R^6$ are all ethoxy groups, and Z is oxygen)) was substituted by fluorine, and the self-extinguishability or incombustibility were evaluated.

When the electric conductivity of the 0.5 mol/l quaternary ammonium salt electrolyte of the phosphazene derivative used in the present example was measured under the measurement conditions described above, the electric conductivity was 4.5 mS/cm.

Further, a non-aqueous electrolyte electric double-layer capacitor was produced in the same manner as that of Example 6, and the internal resistance was measured. The results are shown in Table 3.

Comparative Example 3

A non-aqueous electrolyte was produced in the same manner as that described in Example 6, except that the phosphazene derivative (chain EO-type phosphazene derivative (in the aforementioned general formula (1), a compound in which X has the structure of group (A) expressed by general formula (3), $Y^1$ to $Y^3$ and $Y^5$ to $Y^6$ are all single bonds, $R^1$ to $R^3$ and $R^5$ to $R^6$ are all ethoxy groups, and Z is oxygen)) was not used in the production of the non-aqueous electrolyte. Self-extinguishability and incombustibility were then evaluated. Further, a non-aqueous electrolyte electric double-layer capacitor was produced in the same manner as that of Example 6, and the internal resistance was measured. The results are shown in Table 3.

Comparative Example 4

A non-aqueous electrolyte was produced in the same manner as that described in Example 6, except that in the production of the non-aqueous electrolyte, the phosphazene derivative (chain EO-type phosphazene derivative (in the aforementioned general formula (1), a compound in which X has the structure of group (A) expressed by general formula (3), $Y^1$ to $Y^3$ and $Y^5$ to $Y^6$ are all single bonds, $R^1$ to $R^3$ and $R^5$ to $R^6$ are all ethoxy groups, and Z is oxygen)) was replaced with a methoxy-ethoxy-ethoxy-ethoxy-ethoxy phosphazene derivative (chain MEEEE-type phosphazene derivative (in the aforementioned general formula (1), a compound in which X has the structure of group (A) expressed by general formula (3), $Y^1$ to $Y^3$ and $Y^5$ to $Y^6$ are all single bonds, $R^1$ to $R^3$ and $R^5$ to $R^6$ are all methoxy-ethoxy-ethoxy-ethoxy-ethoxy groups, and Z is oxygen)), and the self-extinguishability or incombustibility were evaluated.

When the electric conductivity of the 0.5 mol/l quaternary ammonium salt electrolyte of the phosphazene derivative used in the present example was measured with the method of measurement described above, the electric conductivity was 0.1 mS/cm.

Further, a non-aqueous electrolyte electric; double-layer capacitor was produced in the same manner as that of Example 6, and the internal resistance was measured. The results are shown in Table 3.

TABLE 3

| | Electric Conductivity of Phosphazene Derivative (0.5 mol/1 quaternary ammonium salt solution) (mS/cm) | Self-Extinguishability or Incombustibility | Evaluation of Internal Resistance (Ω) |
|---|---|---|---|
| Example 6 | 7.5 | Self-Extinguishable | 0.19 |
| Example 7 | 4.8 | Incombustible | 0.19 |
| Example 8 | 4.5 | Incombustible | 0.22 |
| Comparative Example 3 | | Combustible | 0.18 |
| Comparative Example 4 | 0.1 | Incombustible | 0.35 |

In Examples 6 to 8, it is clear that the self-extinguishability or incombustibility of the non-aqueous electrolyte was superior, and that the non-aqueous electrolyte electric double-layer capacitor of the third aspect had a low internal resistance.

In Examples pertaining to the fourth aspect below, the viscosity of the solution was measured with the aforementioned method using the aforementioned viscometer (R-model viscometer Model RE500-SL, manufactured by Tôki Sangyô, Ltd.).

Example 9

Production of the Non-Aqueous Electrolyte

A non-aqueous electrolyte was produced by dissolving tetraethyl ammonium fluoroborate $(C_2H_5)_4N \cdot BF_4$ (quaternary ammonium salt) at a density of 0.5 mol/kg in 50 ml of a phosphazene derivative (chain EO-type phosphazene derivative (in the aforementioned general formula (1), a compound in which X has the structure of group (A) expressed by general formula (3), $Y^1$ to $Y^5$ are all single bonds, $R^1$ to $R^5$ are all ethoxy groups, and Z is oxygen, viscosity at 25° C.: 5.8 mPa·s (5.8 cP), flash point: 155° C.)).

When the relative permittivity of the phosphazene derivative used in Example 9 at a temperature of 25° C. was measured and calculated according to the conditions described above using the aforementioned measuring device, the relative permittivity was 18.5.

Evaluation of Self-Extinguishability of Incombustibility

The obtained non-aqueous electrolyte was evaluated as indicated below in the same manner as the aforementioned method of evaluating self-extinguishability or incombustibility. The results are shown in Table 4.

Evaluation of Incombustibility

An evaluation of "incombustible" was recorded when an ignited flame did not reach a 25 mm line and material deposited from a net did not catch flame.

Evaluation of Self-Extinguishability

An evaluation of "self-extinguishable" was recorded when an ignited flame was extinguished at a 25 mm to 100 mm line and material deposited from a net did not catch flame.

Evaluation of Combustibility

An evaluation of "combustible" was recorded when an ignited flame passed a 100 mm line.

Production of Positive Electrode and Negative Electrode (Polarizable Electrode)

Active carbon (product name: Kuractive-1500, manufactured by Kurare Chemical), acetylene black (conducting agent) and tetrafluoroethylene (PTFE) (binder) were mixed such that the mass ratio thereof was 8/1/1 (active carbon/acetylene black/PTFE) to obtain a mixture.

100 mg of the obtained mixture was extracted and placed in a 20 mmø pressure-proof carbon container, then compounded and formed at a pressure of 150 kgf/cm² and a temperature of 25° C. to produce the positive electrode and negative electrode (polarizable electrode).

Production of Non-Aqueous Electrolyte Electric Double-layer Capacitor

A cell was assembled using the obtained positive electrode and negative electrode, an aluminium metal plate (collector) (thickness: 0.3 mm) and a polypropylene/polyethylene film (cellguard #3501) (separator) (thickness: 25 μm), and sufficiently dried by vacuum drying.

The cell was impregnated in the non-aqueous electrolyte to produce a non-aqueous electrolyte electric double-layer capacitor.

Measurement of Internal Resistance, Evaluation of Long-Term Stability

With regard to the obtained non-aqueous electrolyte electric double-layer capacitor, internal resistance before and after a 20-cycle charge/discharge was measured in the same manner as the aforementioned method of measuring internal resistance. The results are shown in Table 4.

Example 10

A non-aqueous electrolyte was produced in the same manner as that described in Example 9, except that in the production of the non-aqueous electrolyte, the aforementioned phosphazene derivative (chain EO-type phosphazene derivative (in the aforementioned general formula (1), a compound in which X has the structure of group (A) expressed by general formula (3), $Y^1$ to $Y^5$ are all single bonds, $R^1$ to $R^5$ are all ethoxy groups, and Z is oxygen)) was replaced with a phosphazene derivative (chain MO-type phosphazene derivative (in the aforementioned general formula (1), a compound in which X has the structure of group (A) expressed by general formula (3), $Y^1$ to $Y^5$ are all single bonds, $R^1$ to $R^5$ are all methoxy groups, and Z is oxygen, viscosity at 25° C.: 4.8 mPa·s (4.8 cP), flash point: 150° C.)), and the self-extinguishability or incombustibility were evaluated.

When the relative permittivity of the phosphazene derivative used in Example 10 at a temperature of 25° C. was measured and calculated in accordance with the conditions described above using the aforementioned measuring device, the relative permittivity was 18.0. Further, a non-aqueous electrolyte electric double-layer capacitor was produced in the same manner as that of Example 9, the internal resistance was measured and long-term stability was evaluated. The results are shown in Table 4.

Example 11

A non-aqueous electrolyte was produced in the same manner as that described in Example 9, except that in the production of the non-aqueous electrolyte, the aforementioned phosphazene derivative (chain EO-type phosphazene derivative (in the aforementioned general formula (1), a compound in which X has the structure of group (A) expressed by general formula (3), $Y^1$ to $Y^5$ are all single bonds, $R^1$ to $R^5$ are all ethoxy groups, and Z is oxygen)) was replaced with a phosphazene derivative (viscosity at 25° C.: 11.4 mPa·s (11.4 cP), flash point: 257° C.) in which the hydrogen element within the ethoxy group in the phosphazene derivative (chain EO-type phosphazene derivative (in the aforementioned general formula (1), a compound in which X has the structure of group (A) expressed by general formula (3), $Y^1$ to $Y^5$ are all single bonds, $R^1$ to $R^5$ are all ethoxy groups, and Z is oxygen)) was substituted (amount of fluorine in phosphazene derivative: 12.4 vol. %) by fluorine, and the self-extinguishability or incombustibility were evaluated.

When the relative permittivity of the phosphazene derivative used in the present example at a temperature of 25° C. was measured and calculated in accordance with the conditions described above using the aforementioned measuring device, the relative permittivity was 39. Further, a non-aqueous electrolyte electric double-layer capacitor was produced in the same manner as that of Example 9, the internal resistance was measured and long-term stability was evaluated. The results are shown in Table 4.

Comparative Examples 5 and 6

A non-aqueous electrolyte was produced in the same manner as that described in Example 9, except that in the production of the non-aqueous electrolyte, the phosphazene derivative (chain EO-type phosphazene derivative (in the aforementioned general formula (1), a compound in which X has the structure of group (A) expressed by general formula (3), $Y^1$ to $Y^5$ are all single bonds, $R^1$ to $R^5$ are all ethoxy groups, and Z is oxygen)) was replaced with a phosphazene derivative (chain MEE-type phosphazene derivative (in the structural formula below, a compound in which each R is a methoxy-ethoxy-ethoxy group, viscosity at 25° C.:59.6 mPa·s (59.6 cP))), and the self-extinguishability or incombustibility were evaluated.

(PNR$_2$)$_3$ . . . structural formula

Further, when a non-aqueous electrolyte electric double-layer capacitor was produced in the same manner as that of Example 9 and the internal resistance was measured and long-term stability was evaluated, the viscosity of the phosphazene derivative was too high and the value of conductivity was too low (i.e., internal resistance was too high). The results are shown in Table 4 (Comparative Example 5).

When the relative permittivity of the phosphazene derivative used in Comparative Example 5 at a temperature of 25° C. was measured and calculated in accordance with the conditions described above using the aforementioned measuring device, the relative permittivity was 10.0.

On the other hand, after 30 vol. % of diethyl carbonate (viscosity at 25° C.: 0.75 mPa·s (0.75 cP) was incorporated in the obtained phosphazene electrolyte to produce a non-aqueous electrolyte, a non-aqueous electrolyte electric double-layer capacitor was produced in the same manner as above and long-term stability was evaluated by measuring the internal resistance. By thus lowering the viscosity of the non-aqueous electrolyte, excellent values of conductivity and internal resistance were obtained. The results are shown in Table 4 (Comparative Example 6).

TABLE 4

| | Relative Permittivity of Phosphazene Derivative | Measurement of Battery Internal Resistance (Ω) | | Evaluation of Self-Extinguishability or Incombustibility |
| --- | --- | --- | --- | --- |
| | | Before Charge/ Discharge | After 20-Cycle Charge/ Discharge | |
| Example 9 | 18.5 | 0.22 | 0.22 | Incombustible |
| Example 10 | 18.0 | 0.21 | 0.21 | Incombustible |
| Example 11 | 39.0 | 0.22 | 0.22 | Incombustible |
| Comparative Example 5 | 10.0 | 0.46 | 0.56 | Incombustible |
| Comparative Example 6 | | 0.19 | 0.20 | Self-Extinguishable |

According to the first aspect of the present invention, a non-aqueous electrolyte electric double-layer capacitor can be provided which has excellent safety because there is no danger of ignition and there is no danger of bursting or catching flame at the time of short-circuit, which maintains sufficient electric conductivity, in which the surface resistance of the non-aqueous electrolyte is low, and which has excellent properties at low temperatures.

According to the second aspect of the present invention, a non-aqueous electrolyte electric double-layer capacitor can be provided in which long-term stability and safety necessary as a capacitor is maintained, has excellent self-extinguishability or incombustibility, is electrochemically stable, is resistant to deterioration, in which the surface resistance of the non-aqueous electrolyte is low, and has excellent properties at low temperatures.

According to the third aspect of the present invention, a non-aqueous electrolyte electric double-layer capacitor can be provided in which long-term stability and safety necessary as a capacitor is maintained, has excellent self-extinguishability or incombustibility, is resistant to deterioration, in which the surface resistance of the non-aqueous electrolyte is low, and has excellent properties at low temperatures.

According to the fourth aspect of the present invention, a non-aqueous electrolyte electric double-layer capacitor can be provided in which, similar to conventional a non-aqueous electrolyte electric double-layer capacitors, various properties such as low internal resistance and the like are maintained, which has excellent self-extinguishability or incombustibility and excellent resistance to deterioration, and in which by using only a phosphazene derivative as a solvent achieves long-term stability, can be produced easily and has excellent properties at low temperatures.

What is claimed is:

1. A non-aqueous electrolyte electric double-layer capacitor comprising:
    a non-aqueous electrolyte having a supporting electrolyte and a phosphazene derivative; and
    a positive electrode and a negative electrode,
    wherein said phosphazene derivative has a relative permittivity of 15 or higher at a temperature of 25° C. and is represented by a general formula as follows:

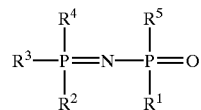

wherein, in the general formula, $R^1$, $R^2$, $R^3$, $R^4$ and $R^5$ indicate one of an alkoxy group having 1 to 8 carbon atoms and a group having ether bonds.

2. A non-aqueous electrolyte electric double-layer capacitor according to claim 1, wherein a viscosity of the phosphazene derivative at a temperature of 25° C. is 100 cP or lower.

3. A non-aqueous electrolyte electric double-layer capacitor according to claim 1, wherein the non-aqueous electrolyte has an aprotic organic solvent.

4. A non-aqueous electrolyte electric double-layer capacitor according to claim 3, wherein the aprotic organic solvent is a carbon ester.

5. A non-aqueous electrolyte electric double-layer capacitor according to claim 1, wherein a flash point of the non-aqueous electrolyte is 100° C. or higher.

6. A non-aqueous electrolyte electric double-layer capacitor according to claim 1, further comprising an organic solvent, wherein
    a potential window of the phosphazene derivative is within a range having a lower limit value between –0.5V and +0.5V and an upper limit value between +4.5V and +8.5V, and
    a potential window of the organic solvent is within a wider range than the potential window of the phosphazene derivative.

7. A non-aqueous electrolyte electric double-layer capacitor according to claim 6, wherein the potential window of the phosphazene derivative is within a range having a lower limit value between –0.5V and 0V and an upper limit value between +5V and +8.5V.

8. A non-aqueous electrolyte electric double-layer capacitor according to claim 6, wherein the phosphazene derivative has a substituent having a halogen element within the molecular structure thereof.

9. A non-aqueous electrolyte electric double-layer capacitor according to claim 6, wherein the organic solvent is an aprotic organic solvent having one of a ring ester compound and a chain ester compound.

10. A non-aqueous electrolyte electric double-layer capacitor according to claim 9, wherein the ring ester compound is any one of at least an ethylene carbonate, a propylene carbonate and a γ-butyrolactone.

11. A non-aqueous electrolyte electric double-layer capacitor according to claim 9, wherein the chain ester compound is a diethyl carbonate.

12. A non-aqueous electrolyte electric double-layer capacitor according to claim 1, wherein the phosphazene derivative includes a quaternary ammonium salt solution (0.5 mol/l)) having a conductivity of 2.0 mS/cm or higher.

13. A non-aqueous electrolyte electric double-layer capacitor according to claim 12, wherein the quaternary ammonium salt solution has a conductivity of 4.0 mS/cm or higher.

14. A non-aqueous electrolyte electric double-layer capacitor according to claim 1, wherein the phosphazene derivative has a viscosity of 20 mPa·s (20 cP) or lower at a temperature of 25° C.

15. A non-aqueous electrolyte electric double-layer capacitor according to claim 14, wherein the relative permittivity of the phosphazene derivative at a temperature of 25° C. is 30 or higher.

16. A double layer capacitor comprising:
  (a) a non-aqueous electrolyte composition having a supporting electrolyte and a combustibility suppressant; and
  (b) a positive electrode and a negative electrode each electrically insulated from one another, disposed in electrical contact with the non-aqueous electrolyte composition, wherein the combustibility suppressant is a phosphazene derivative having a relative permittivity of 15 or higher at a temperature of 25° C. and is represented by a general formula as follows:

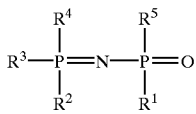

wherein, in the general formula, $R^1$, $R^2$, $R^3$, $R^4$ and $R^5$ indicate one of an alkoxy group having 1 to 8 carbon atoms and a group having ether bonds.

17. A double-layer capacitor according to claim 16, wherein the non-aqueous electrolyte composition includes an organic solvent.

18. A method of making a double-layer capacitor, the method comprising the steps of:
  (a) providing a non-aqueous electrolyte mixture having a supporting electrolyte and an agent which produces a fire-suppressing gas when heated;
  (b) disposing positive and negative electrodes in electrical contact with the non-aqueous electrolyte mixture and electrically insulated from one another,
  wherein the agent, which produces a fire-suppressing gas is a phosphazene derivative having a relative permittivity of 15 or higher at a temperature of 25° C. and is represented by a general formula as follows:

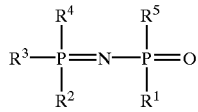

wherein, in the general formula, $R^1$, $R^2$, $R^3$, $R^4$ and $R^5$ indicate one of an alkoxy group having 1 to 8 carbon atoms and a group having ether bonds.

19. A method of making a double-layer capacitor according to claim 18, wherein the step of providing a non-aqueous electrolyte composition, includes providing an organic solvent with the non-aqueous electrolyte composition.

* * * * *